United States Patent

[11] 3,615,782

[72] Inventors Mohendra S. Bawa
Richardson;
Andrew J. Petty, Mesquite, both of Tex.
[21] Appl. No. 821,062
[22] Filed May 1, 1969
[45] Patented Oct. 26, 1971
[73] Assignee Texas Instruments Incorporated
Dallas, Tex.

[54] HIGH-TEMPERATURE PAINT MATERIAL
3 Claims, No Drawings
[52] U.S. Cl........................................................ 106/84,
106/56, 106/69
[51] Int. Cl........................................................ C09d 1/02
[50] Field of Search............................................ 106/38.28,
38.3, 84, 56, 69

[56] References Cited
UNITED STATES PATENTS
2,656,281 10/1953 Wasserman.................. 106/84
2,951,773 9/1960 Helle et al..................... 106/84
3,070,460 12/1962 Huppke........................ 106/84

Primary Examiner—James E. Poer
Attorneys—Samuel M. Mims, Jr., James O. Dixon, Andrew M. Hassell, Harold Levine, Melvin Sharp, William E. Hiller and John E. Vandigriff ABSTRACT: A paint base material capable of withstanding temperatures on the order of about 900° C. for protecting metals against chemical attack, having the following composition by weight:

| | |
|---|---|
| Silica sand | 30% |
| $NaLiCO_3$ | 45% |
| $Cr_2O_3$ | 7.5% |
| $Fe_2O_3$ | 5% |
| Graphite | 12.5% |

The base material can be mixed with alkali metal silicates, for example, sodium and potassium silicate, to provide a paint composition adaptable for easy application.

HIGH-TEMPERATURE PAINT MATERIAL

This invention relates to improved paint formulations and, more particularly, to an improved paint composition for protecting metals, such as stainless steels, aluminum, and copper, from the effects of chemical corrosion at elevated temperatures.

BACKGROUND OF THE INVENTION

Field of the Invention and Description of the Prior Art

One of the problems characteristically found in heavily industrialized areas is that of corrosion of metal structures, including storage tanks, pipe racks, and the like, due to atmospheric exposure, particularly in wet environments. For example, in oil refineries and chemical plants located on the Gulf Coast where high-humidity and even salt spray conditions frequently prevail, the corrosion problem becomes particularly acute. In other environments, such as furnace interiors and industrial equipment characterized by a heated operational environment, the problem of corrosion is accelerated by the influence of elevated temperatures. Thus, it is quite apparent there exists a need in these and other industrial environments for protecting metal substrates exposed to such corrosive conditions from the effects of chemical attack. Many paint formulations have been devised to provide such protection, ranging from epoxy resin coatings to "red lead" primer type applications which may be applied by brush or spray. One of the problems inherent in many of these industrial coatings is a susceptibility to peeling or flaking when exposed to elevated temperatures. Heretofore, many of these coatings were thus either totally destroyed or rendered ineffective when applied to a surface which had an operating temperature in excess of 200° to 300° or 400°C. and, in some cases, even lower temperatures. It will be recognized, of course, that the recommended operating temperatures of a particular coating, including the formulation of this invention, cannot extend the operating or service temperature recommended for the metal to which it is applied.

In view of the foregoing limitations in the prior art, the impact of the instant invention in the art of protecting metal surfaces, and particularly metal surfaces exposed to elevated temperatures, becomes clear. The present invention is concerned with the selection of proper ingredients in particular proportions to provide a paint composition which will effectively protect metal surfaces against chemical attack both at ambient and elevated temperatures.

SUMMARY OF THE INVENTION

Accordingly, in a broad aspect of the invention, there is provided a base material for a paint composition which is composed of at least the following ingredients in the following proportions by weight:

| Silica sand | 24 to 30% |
| NaLiCO$_3$ | 38 to 47% |
| Cr$_2$O$_3$ | 7.5 to 12.5% |
| Fe$_2$O$_3$ | 5 to 12.5% |
| Graphite | 7.5 to 12.5% |

It will be recognized that this base material is combined with certain other vehicular ingredients in order to provide a composition having a consistency which may be readily applied to metal surfaces. Accordingly, certain constituents known to those skilled in the art, such as alkali metal silicates exemplified by sodium silicate and potassium silicate, may be utilized to provide the proper vehicle in which the above-noted base material may be dissolved or mixed in order to provide a suitable composition consistency.

Thus, a suitable paint composition, according to the invention, contains sodium silicate, potassium silicate, and a base material having the above-noted ingredients in the disclosed composition range. It will be recognized that there may be many alkali metal silicate concentrations which may be utilized to provide a paint having the desired consistency. However, in a preferred embodiment of the invention, the base material above noted is mixed with substantially equal quantities of sodium silicate and potassium silicate to provide a brushable or sprayable paint composition which may be easily applied to the desired metal surface.

In a still further preferred embodiment of the invention, the base material is composed of ingredients having the following proportions by weight:

| Silica sand | 30% |
| NaLiCO$_3$ | 45% |
| Cr$_2$O$_3$ | 7.5% |
| Fe$_2$O$_3$ | 5% |
| Graphite | 12.5% |

This particular proportion of ingredients is preferably mixed with a solution containing equal parts of sodium silicate and potassium silicate and may thereafter be easily applied to a metal substrate.

In a most preferred embodiment of the invention, a base material having the proportions disclosed immediately above is mixed with substantially equal quantities by weight of sodium silicate and potassium silicate to provide a composition sufficiently liquid to permit ready application to a desired metal.

As heretofore noted, the invention is characterized by flexibility in that it is designed to protect metal substrates such as stainless steel, copper, nickel, and aluminum at temperatures ranging from ambient temperature to about 900° C. and, more preferably, from about 700° to 800° C.

It will further be noted that there is no necessity for application of a particular method of cleaning the substrate surface prior to applying the paint composition. Conventional techniques, such as ultrasonic vibrations, solvent cleaning by use of such cleaning agents as methyl-ethyl keytone, and abrasive techniques such as sandblasting, may be utilized.

Furthermore, the method of preparing the base material and overall paint composition can be varied, within certain limitations, to provide the desirable ingredients in the proper proportions. The following examples illustrate suitable methods of preparing the paint formulation of this invention.

EXAMPLE I

Three grams of powdered silica sand (−170 were mixed with 4.5 grams of equimolal sodium-lithium carbonate powder. The mass was heated at 800° C. for 4 hours, cooled, and then ground to 170 mesh size. To the powdered mass were added 1.25 grams of graphite powder, 0.75 grams of chromium oxide, and 0.5 grams of ferric oxide. The mixture was then blended with 10 grams of a 50—50 solutions of sodium and potassium silicate to a brushable consistency.

EXAMPLE II

Three grams of powdered silica sand, 4.5 grams of equimolal sodium-lithium carbonate, 1.25 grams of graphite powder, 0.75 grams of chromium oxide, and 0.5 grams of ferric oxide were mixed and heated at 800° C. for 4 hours. The resultant mass was cooled, ground to 170 mesh size, and subsequently made into a brushable paint by mixing with 10 grams of a 50—50 solution of sodium and potassium silicates.

EXAMPLE III

Three grams of powdered silica sand and 5 grams of equimolal sodium-lithium carbonate were blended with 5 cc of deionized water. To this semipaste consistency were added 1.25 grams of graphite, 0.75 grams of chromium oxide, 0.50 grams of ferric oxide, and five grams of potassium silicate. The entire mass was then blended to provide a composition having a consistency compatible with brushing or spraying.

The paint composition heretofore described may be applied in conventional manners by brushing, spraying, or the like. In order to provide the proper curing for good adherency and protection, it is preferred that the paint be air dried and heat treated according to the procedure outlined in example IV.

EXAMPLE IV

The paint prepared according to the procedures noted in examples I–III was brushed on strips of stainless steel type 316 and 416, copper, aluminum, and nickel. The samples were then air dried and were noted to be light brown in color, the paint film being very hard and adherent. On further heating, the film passed through the molten state at 700° to 750° C. and, on subsequent cooling, was observed to be mattelike green in color, hard, and very adherent to the metals. The paint was then cured at 850° to 900° C. for about 2 to 5 minutes, after which it was found to be speckled green in color. This film proved to be very hard and well adhered to the metal.

What is claimed is:

1. A base material for a paint composition consisting essentially of the following ingredients by weight:

| | |
|---|---|
| Silica sand | 24 to 30% |
| NaLiCO$_3$ | 38 to 47% |
| Cr$_2$O$_3$ | 7.5 to 12.5 |
| Fe$_3$O$_4$ | 5 to 12.5% |
| Graphite | 7.5 to 12.5% |

2. The base material of claim 1, wherein said ingredients are present in approximately the following proportions by weight:

| | |
|---|---|
| Silica sand | 30% |
| NaLiCO$_3$ | 45% |
| Cr$_2$O$_3$ | 7.5% |
| Fe$_3$O$_4$ | 5% |
| Graphite | 12.5% |

3. A paint composition for protecting metals from chemical attack at elevated temperatures consisting essentially of:

a. a base material containing the e following ingredients by weight:

| | |
|---|---|
| Silica sand | 30% |
| NaLiCO$_3$ | 45% |
| Cr$_2$O$_3$ | 7.5% |
| Fe$_3$O$_4$ | 5 |
| Graphite | 12.5%; and | b. substantially equal quantities by weight of sodium silicate and potassium silicate, said sodium silicate and potassium silicate together being present in said composition in sufficient quantity to render said composition sufficiently liquid to permit application thereof to said metals.

* * * * *